US009227524B2

(12) United States Patent
Ito

(10) Patent No.: US 9,227,524 B2
(45) Date of Patent: Jan. 5, 2016

(54) ELECTRIC-POWERED VEHICLE

(75) Inventor: Satoshi Ito, Hamamatsu (JP)

(73) Assignee: SUZUKI MOTOR CORPORATION, Tokyo (JP)

(*) Notice: Subject to any disclaimer, the term of this patent is extended or adjusted under 35 U.S.C. 154(b) by 219 days.

(21) Appl. No.: 13/818,830

(22) PCT Filed: Jul. 28, 2011

(86) PCT No.: PCT/JP2011/067290
§ 371 (c)(1),
(2), (4) Date: Feb. 25, 2013

(87) PCT Pub. No.: WO2012/026278
PCT Pub. Date: Mar. 1, 2012

(65) Prior Publication Data
US 2013/0154360 A1  Jun. 20, 2013

(30) Foreign Application Priority Data

Aug. 24, 2010 (JP) ................................. 2010-186755

(51) Int. Cl.
*B60L 11/00* (2006.01)
*H02P 3/06* (2006.01)
(Continued)

(52) U.S. Cl.
CPC ............. *B60L 11/1851* (2013.01); *B60L 1/003* (2013.01); *B60L 3/0046* (2013.01); *B60L 3/04* (2013.01);
(Continued)

(58) Field of Classification Search
CPC ....... H02P 3/14; B60L 15/00; B60L 11/1851; B60L 3/04; B60L 11/1864; B60L 15/20; B60L 2240/423; B60W 20/00; H02J 7/0016; Y02T 10/642; Y02T 10/7055

USPC ................... 701/22; 307/10.1, 9, 1; 318/376; 180/65.285; 903/902
See application file for complete search history.

(56) References Cited

U.S. PATENT DOCUMENTS 6,208,039 B1   3/2001  Mendelsohn et al.
6,265,850 B1   7/2001  Kimura et al.
(Continued)

FOREIGN PATENT DOCUMENTS

DE   10 2009 020 178    11/2010
GB        2463145 B     10/2010
(Continued)

OTHER PUBLICATIONS

International Preliminary Report on Patentability, dated Mar. 19, 2013, which issued during the prosecution of International Patent Application No. PCT/JP2011/067290, which corresponds to the present application.
(Continued)

*Primary Examiner* — Hal Kaplan
(74) *Attorney, Agent, or Firm* — Troutman Sanders LLP

(57) ABSTRACT

An electric-powered vehicle is equipped with a power storage system having power storage devices each including a plurality of serially connected cells, and an integration control device. Contactors and current sensors are connected in series to the power storage devices. Control devices capable of managing statuses of the power storage devices are provided in addition to the power storage devices, the contactors, and the current sensors, thereby forming unit power storage modules. The unit power storage modules are connected in parallel. An electrical load whose driving is controlled by using powers of the power storage devices is provided. The integration control device is connected to the electrical load and the control devices of the unit power storage modules.

3 Claims, 3 Drawing Sheets

(51) Int. Cl.
*B60W 10/04* (2006.01)
*B60W 20/00* (2006.01)
*B60L 11/18* (2006.01)
*B60L 11/12* (2006.01)
*H01M 10/48* (2006.01)
*H02J 7/00* (2006.01)
*H02J 7/04* (2006.01)
*B60L 1/00* (2006.01)
*B60L 3/00* (2006.01)
*B60L 3/04* (2006.01)
*B60L 15/20* (2006.01)

(52) U.S. Cl.
CPC .......... *B60L 11/126* (2013.01); *B60L 11/1816* (2013.01); *B60L 11/1853* (2013.01); *B60L 11/1859* (2013.01); *B60L 11/1864* (2013.01); *B60L 11/1866* (2013.01); *B60L 15/20* (2013.01); *H01M 10/482* (2013.01); *H02J 7/0016* (2013.01); *H02J 7/044* (2013.01); *B60L 2200/26* (2013.01); *B60L 2210/10* (2013.01); *B60L 2210/30* (2013.01); *B60L 2240/421* (2013.01); *B60L 2240/423* (2013.01); *B60L 2240/545* (2013.01); *B60L 2240/547* (2013.01); *B60L 2240/549* (2013.01); *Y02T 10/6217* (2013.01); *Y02T 10/642* (2013.01); *Y02T 10/7005* (2013.01); *Y02T 10/7055* (2013.01); *Y02T 10/7061* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01)

(56) References Cited

U.S. PATENT DOCUMENTS

| | | | |
|---|---|---|---|
| 8,697,267 B2 * | 4/2014 | Colello | G01R 31/3658 320/118 |
| 2010/0079108 A1 | 4/2010 | Monden et al. | |
| 2011/0208383 A1 * | 8/2011 | Yamamoto et al. | 701/22 |

FOREIGN PATENT DOCUMENTS

| | | |
|---|---|---|
| JP | 9-98510 A | 4/1997 |
| JP | 2000-340266 A | 12/2000 |
| JP | 2001-95163 A | 4/2001 |
| JP | 2001-185228 A | 7/2001 |
| JP | 2004-6138 A | 1/2004 |
| JP | 2004-28861 A | 1/2004 |
| JP | 2004-31014 A | 1/2004 |
| JP | 2004-31123 A | 1/2004 |
| JP | 2004-312863 A | 11/2004 |
| JP | 2008-153150 A | 7/2008 |
| JP | 2008-288109 A | 11/2008 |
| JP | 2009-33936 A | 2/2009 |
| JP | 2010-3619 A | 1/2010 |
| JP | 2010-88202 A | 4/2010 |
| JP | 2010-63259 A | 5/2010 |

OTHER PUBLICATIONS

German Office Action dated Oct. 27, 2014, which issued during prosecution of German Application No. 11 2011 102 789.3, which corresponds to the present application.

International Search Report, dated Nov. 1, 2011, which issued during the prosecution of International Patent Application No. PCT/JP2011/067290, of which the present application is the national phase.

* cited by examiner

ELECTRIC-POWERED VEHICLE

CROSS-REFERENCE TO RELATED APPLICATIONS

This is a U.S. national phase application under 35 U.S.C. §371 of International Patent Application No. PCT/JP2011/067290, filed on Jul. 28, 2011, and claims benefit of priority to Japanese Patent Application No. 2010-186755, filed Aug. 24, 2010. The International Application was published on Mar. 1, 2012 as International Publication No. WO 2012/026278under PCT Article 21(2). The entire contents of these applications are hereby incorporated by reference.

TECHNICAL FIELD

This invention relates to an electric-powered vehicle, and more particularly to an electric-powered vehicle such as a hybrid vehicle and an electric vehicle, equipped with power storage devices, wherein management control is simplified and easiness of capacity expansion is improved.

BACKGROUND ART

In electric vehicles such as a hybrid vehicle and an electric vehicle capable of being self-sustaining by powers of power storage devices mounted thereon, high-voltage power storage devices having a substantially specialized design have been conventionally used. This is intended to improve performance (for example, safety performance, power performance, and the like) of a vehicle system. Such an electric-powered vehicle is equipped with a power storage system having: high-voltage power storage devices in each of which a plurality of cells are connected in series; and an integration control device which integrally controls the power storage devices and the vehicle.

Arts of an electric-powered vehicle equipped with the power storage system having: the conventional power storage devices in each of which the plural cells are connected in series; and the integration control device which controls the power storage devices and the vehicle include, for example, the following Patent Literatures 1~7. Japanese Laid-open Patent Publication No. 2009-033936 being Patent Literature 1 describes an art relating to individual ON control of parallel connected batteries. Japanese Laid-open Patent Publication No. 2000-340266 being Patent Literature 2 describes an art relating to abnormality determination based on a temperature deviation of parallel-connected batteries. Japanese Laid-open Patent Publication No. 2001-095163 being Patent Literature 3 discloses an art for independently controlling currents of parallel-connected batteries. Japanese Laid-open Patent Publication No. 2004-028861 being Patent Literature 4 describes an art relating to voltage detection logic of a parallel battery pack. Japanese Laid-open Patent Publication No. 2004-031014 being Patent Literature 5 describes an art relating to a method of calculating a maximum charge/discharge power when parallel battery packs are connected in series. Japanese Laid-open Patent Publication No. 2004-031123 being Patent Literature 6 describes an art relating to a method of calculating a capacity of a parallel battery pack. Japanese Laid-open Patent Publication No. 2008-153150 being Patent Literature 7 describes an art relating to abnormality detection and disconnection based on the calculation of internal resistances of parallel-connected batteries.

CITATION LIST

Patent Literature

Patent Literature 1: Japanese Laid-open Patent Publication No. 2009-033936

Patent Literature 2: Japanese Laid-open Patent Publication No. 2000-340266

Patent Literature 3: Japanese Laid-open Patent Publication No. 2001-095163

Patent Literature 4: Japanese Laid-open Patent Publication No. 2004-028861

Patent Literature 5: Japanese Laid-open Patent Publication No. 2004-031014

Patent Literature 6: Japanese Laid-open Patent Publication No.2004-031123

Patent Literature 7: Japanese Laid-open Patent Publication No. 2008-153150

SUMMARY OF INVENTION

Technical Problem

A high-voltage power storage device requires a control device. Further, in order to protect the power storage device, a power generator•a drive motor•an external charger and so on need to be controlled by an integration control device of a vehicle system. Therefore, in an electric-powered vehicle, if power storage devices are changed due to a capacity change or the like, the control by the integration control device of the vehicle system has to be changed.

As for an electric-powered vehicle, cases where the same electric-powered vehicle is equipped with high-voltage power storage devices different in specification such as a power storage capacity have recently been increasing in accordance with an increase of plug-in hybrid vehicles, an increase of cruising distance of electric vehicles, and the like. In this case, even when the vehicle system except the high-voltage power storage devices is almost the same, the control by the integration control device of the vehicle system needs to be greatly changed. Further, when the specification of the loaded power storage devices is changed, the control by the control devices of the power storage devices needs to be changed. Consequently, development man-hours of the control devices also increase. Therefore, the conventional power storage system mounted on the electric-powered vehicle has a problem that a specification change represented by the capacity change of the power storage devices is difficult and the power storage system does not have sufficient scalability.

In consideration of the above-described circumstances, problems to be solved by the present invention are to provide an electric-powered vehicle which is equipped with a power storage system having a plurality of power storage devices connected in parallel and in which a specification change such as a capacity change is easy, to provide an electric-powered vehicle in which power storage devices are easily managed, and to provide an electric-powered vehicle which is equipped with a power storage system capable of easily increasing/decreasing the number of power storage devices connected in parallel and thus having high scalability.

Solution to Problem

To solve the aforesaid problems, the present invention includes: a plurality of parallel-connected unit power storage modules each including a power storage device, a contactor and a current sensor which are connected in series to the power storage device, and a control device capable of managing a status of the power storage device; an electrical load whose driving is controlled by using powers of the power storage devices; and an integration control device connected to the control devices and the power storage devices of the unit power storage modules.

Advantageous Effects of Invention

In the electric-powered vehicle of the invention, the scale of the power storage system can be enlarged or reduced and scalability of a capacity can be ensured by an increase/decrease of the power storage devices. Further, in the electric-powered vehicle of the invention, the integration control device need not manage details of the individual unit power storage modules, which can simplify management control and at the same time improve easiness of capacity expansion.

DESCRIPTION OF EMBODIMENTS

Hereinafter, an example of the invention will be described based on the drawings.

EXAMPLE

Figure 1:
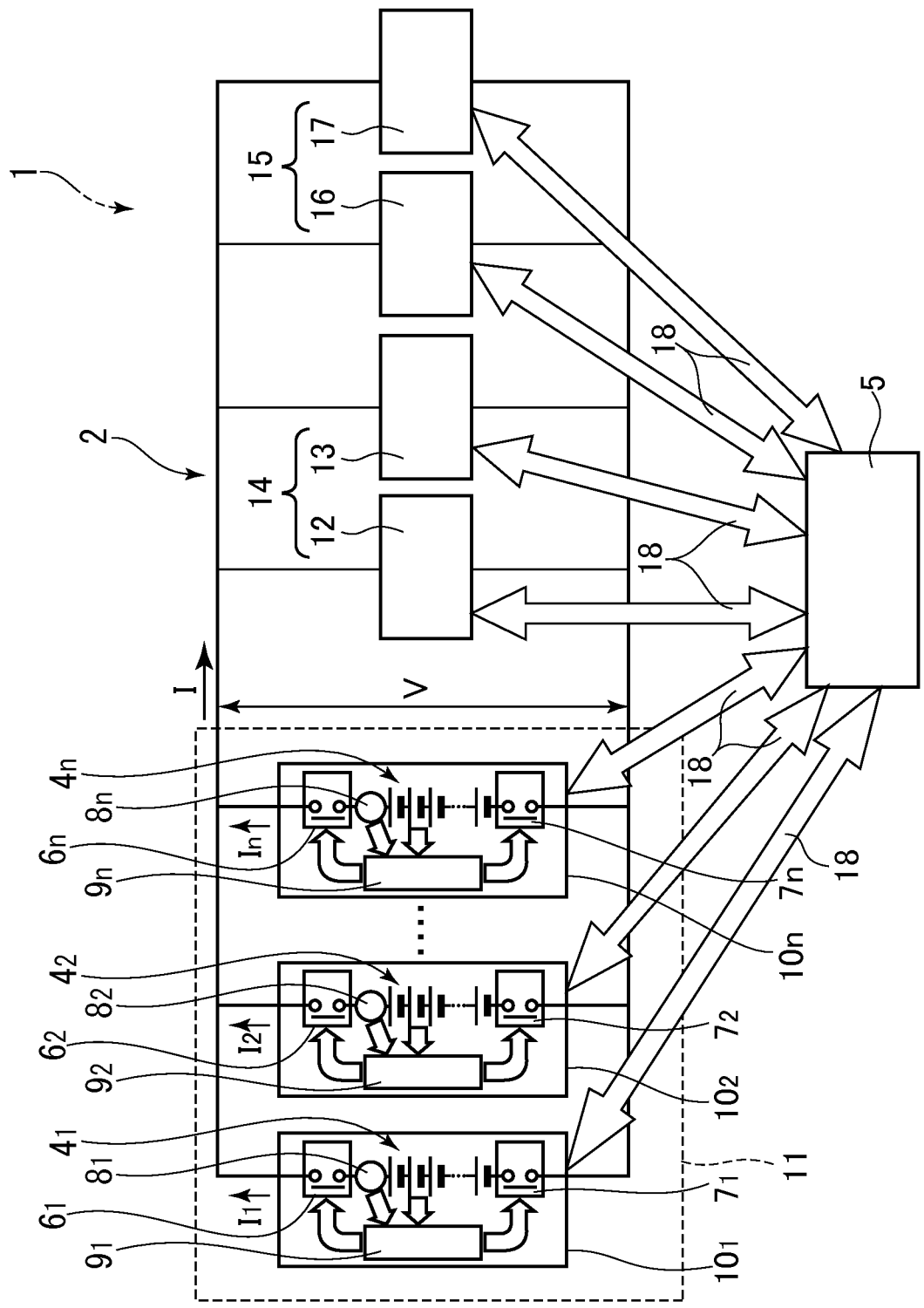
FIG. 1 is a system block diagram of a power storage system of an electric-powered vehicle (example).
Figure 2:
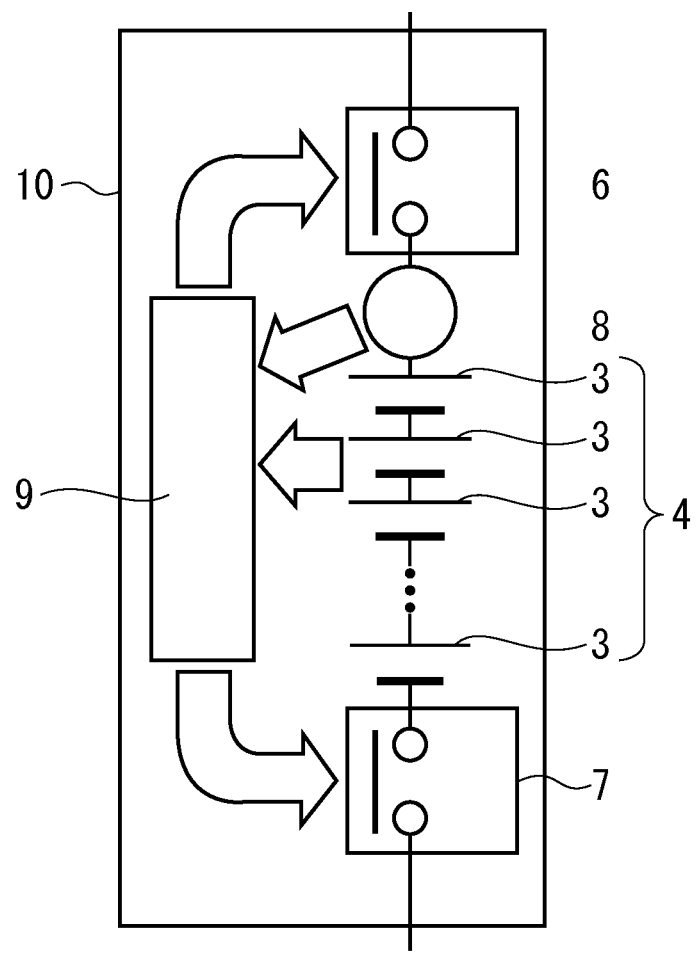
FIG. 2 is a circuit diagram of a unit power storage module (example).
Figure 3:
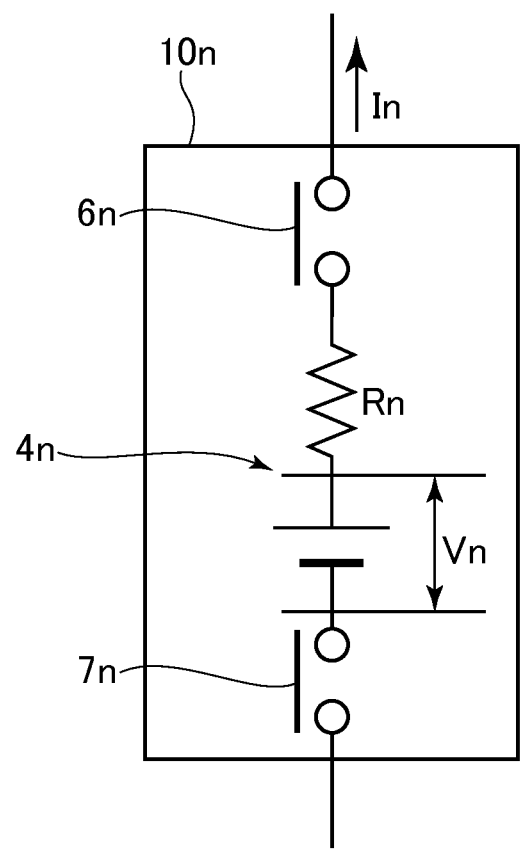
FIG. 3 is an electric model diagram of the unit power storage module (example).

FIG. 1 to FIG. 3 show the example of the invention. In FIG. 1, 1 denotes an electric-powered vehicle and 2 denotes a power storage system. The power storage system 2 mounted on the electric-powered vehicle 1 has a plurality of unit power storage modules $10_1$~$10_n$ and an integration control device 5. The unit power storage modules $10_1$~$10_n$ have power storage devices $4_1$~$4_n$ (refer to FIG. 2) each having a plurality of cells connected in series and control devices $9_1$ to $9_n$ capable of managing statuses of the power storage devices $4_1$~$4_n$. Note that the electric-powered vehicle 1 mentioned in the present invention includes a hybrid vehicle and an electric vehicle having the power storage devices $4_1$~$4_n$ and being self-sustaining by powers of the power storage devices $4_1$~$4_n$. Further, the electric-powered vehicle 1 mentioned in the present invention may have any size. For example, the electric-powered vehicle 1 mentioned in the present invention includes a mini car (motorized vehicle), a commuter, a standard-size vehicle, and the like.

As shown in FIG. 1 and FIG. 2, contactors $6_1$ to $6_n$ and contactors $7_1$ to $7_n$ are serially connected to + sides and − sides of the power storage devices $4_1$~$4_n$ respectively. Further, current sensors $8_1$ to $8_n$ are connected in series between the + sides of the power storage devices $4_1$ to $4_n$ and the contactors $6_1$ to $6_n$ connected to the + sides of the power storage devices $4_1$~$4_n$. The power storage devices $4_1$~$4_n$, the contactors $6_1$ to $6_n$, $7_1$~$7_n$, the current sensors $8_1$~$8_n$, and the control devices $9_1$~$9_n$ form the unit power storage modules $10_1$~$10_n$.

The control devices $9_1$~$9_n$ of the unit power storage modules $10_1$~$10_n$ perform the following controls. (1) To detect statuses of currents, total voltages, cell voltages, and temperatures of the the power storage devices $4_1$~$4_n$ by not-shown sensors. (2) To calculate SOCs (States of Charge) based on the detected pieces of status information. (3) To output the detected pieces of status information to the integration control device 5. (4) To open/close (including to disconnect) the contactors $6_1$~$6_n$, $7_1$~$7_n$ based on a request from the integration control device 5.

The power storage system 2 has a module system 11. The module system includes the plural unit power storage modules $10_1$~$10_n$ connected in parallel, as shown in FIG. 1. In this example, n pieces of the unit power storage module $10_1$~ the unit power storage module $10_n$ connected in parallel form the module system 11. The first unit power storage module $10_1$ includes the power storage device $4_1$, the contactors $6_1$, $7_1$, the current sensor $8_1$, and the control device $9_1$. Further, the n-th unit power storage module $10_n$ includes the power storage device $4_n$, the contactors $6_n$, $7_n$, the current sensor $8_n$, and the control device $9_n$.

Further, the power storage system 2 has one electrical load or more and a power input/output device 15. It has one electrical load or more. The driving of the electrical load is controlled by using powers of the the power storage devices $4_1$~$4_n$ included in the respective unit power storage modules $10_1$~$10_n$ of the module system 11. In this example, as the electrical load, a dynamotor 14 composed of a power generator 12 and a drive motor 13 is mounted. The power input/output device 15 is capable of controlling the input and output of the powers to/from the the power storage devices $4_1$~$4_n$ included in the respective unit power storage modules $10_1$~$10_n$ of the module system 11. The power input/output device 15 is composed of a DC-DC converter 16 and an external charger 17.

The control devices $9_1$~$9_n$ included in the respective unit power storage modules $10_1$~$10_n$, the power generator 12 and the drive motor 13 included in the dynamotor 14 being the electrical load, and the DC-DC converter 16 and the external charger 17 included in the power input/output device 15 are connected to the integration control device 5 by data communication lines 18.

The integration control device 5 controls the power generator 12 and the drive motor 13 included in the dynamotor 14, and the DC-DC converter 16 and the external charger 17 included in the power input/output device 15. Further, the integration control device 5 obtains the pieces of status information of the respective power storage devices $4_1$~$4_n$ from the control devices $9_1$~$9_n$ of the respective unit power storage modules $10_1$~$10_n$, and compares the obtained pieces of status information of the respective power storage devices $4_1$~$4_n$ with one another. The integration control device 5 controls the driving of the dynamotor 14 being the electrical load based on a worst value obtained by the comparison among the pieces of status information. Further, when any of the the unit power storage modules $10_1$~$10_n$ has an abnormality, the integration control device 5 disconnects the abnormal one of the the unit power storage modules $10_1$~$10_n$ and performs drive torque limitation control of the drive motor 13 or power generation limitation control of the power generator 12.

The power storage system 2 mounted on the electric-powered vehicle 1 has the module system 11 configured by the unit power storage modules of the same type connected in parallel. One unit power storage module is a complex of the high-voltage power storage device $4_1$~$4_n$ having a plurality of cells 3 connected in series, the contactors $6_1$~$6_n$, $7_1$~$7_n$, the current sensor $8_1$~$8_n$, and the control device $9_1$~$9_n$. According to the power storage system 2 having such a structure, a capacity change by an increase/decrease of the power storage devices $4_1$~$4_n$ in a certain electric-powered vehicle 1 can be realized with a minimum man-hour.

Further, when the power storage system 2 having the module system 11 in which the plural unit power storage modules $10_1$~$10_n$ are connected in parallel is mounted on a new electric-powered vehicle 1, this structure leads to a reduction in development man-hours of the control devices $9_1$~$9_n$ capable of managing the statuses of the power storage devices $4_1$~$4_n$.

The unit power storage modules $10_1$~$10_n$ have the following electric characteristics. Here, the following expressions (1), (2), (3) hold, where $V_n$, $I_n$, and $R_n$ are a voltage, a current, and an internal resistance of the unit power storage module n respectively as shown in FIG. 3, and V•I•R are a voltage•a current•an internal resistance as the module system 11 respectively as shown in FIG. 1.

$$V = V_1 - R_1 I_1 = V_2 - R_2 I_2 = \ldots = V_n - R_n I_n \quad (1)$$

$$I = I_1 + I_2 + \ldots + I_n \quad (2)$$

$$1/R = 1/R_1 + 1/R_2 + \ldots + 1/R_n \quad (3)$$

It is seen from these expressions (1), (2), (3) that the module system 11 has the following properties.

As the number of the unit power storage modules $10_1 \sim 10_n$ of the module system 11 becomes larger, the internal resistance decreases. Therefore, a high-voltage battery for hybrid vehicles is usable in an electric vehicle.

When the current I of the module system 11=0, the unit power storage modules $10_1$ to $10_n$ are equal in voltage. Therefore, automatic correction of voltage variation is enabled.

The current $I_n$ of the unit power storage module $10_1 \sim 10_n$ whose internal resistance is large becomes small. Therefore, a deterioration degree can be made uniform.

Consequently, under a normal use condition, the currents $I_n$ flowing into the respective unit power storage modules $10_1 \sim 10_n$ of the module system 11 are substantially equal, and their SOCs (charge amounts) are also substantially equal. Therefore, the power storage system 2 is by no means inferior to a conventional high-voltage battery system when in use.

The integration control device 5 can perform the control based on the worst value of the pieces of status information such as the currents•voltages•SOCs•temperatures and so on sent from the control devices $9_1 \sim 9_n$ of the respective unit power storage modules $10_1 \sim 10_n$. Then, in a normal environment, the integration control device 5 does not perform any special individual control of the contactors $6_1 \sim 6_n$, $7_1 \sim 7_n$, and the module system 11 can be used as one high-voltage battery. Further, at an abnormal time, the whole module system 11 can also be stopped by the integration control device 5, similarly to a conventional power storage system on which high-voltage batteries are mounted. However, the integration control device 5 can also bring the electric-powered vehicle 1 into escape running by positively controlling the contactors $6_1 \sim 6_n$, $7_1 \sim 7_n$ of the respective unit power storage modules $10_1 \sim 10_n$ individually.

Besides, since the unit power storage modules $10_1 \sim 10_n$ respectively have the contactors $6_1 \sim 6_n$, $7_1 \sim 7_n$, the current sensors $8_1 \sim 8_n$, and so on, the module system 11 can exhibit the following operations and effects.

It is possible to disconnect an abnormal one of the unit power storage modules $10_1 \sim 10_n$. Therefore, the electric-powered vehicle 1 is capable of escape running.

At the time of an internal short-circuit, a current deviation ΔI among the unit power storage modules $10_1 \sim 10_n$ becomes large. Therefore, an abnormality of the cells 3 can be easily found.

The number of the unit power storage modules $10_1 \sim 10_n$ replaced due to deterioration can be minimized, which is suitable for a long-term use.

Even if some of the current sensors $8_1 \sim 8_n$ or the control devices $9_1 \sim 9_n$ capable of managing the statuses of the power storage devices $4_1 \sim 4_n$ falls into a failure, a possibility of overcharge•over-discharge is low. Since states of the unit power storage modules $10_1 \sim 10_n$ are thought to be substantially the same, normal control becomes stable. Even if some of the unit power storage modules $10_1 \sim 10_n$ is disconnected due to the abnormality occurrence, the function of the module system 11 is not lost. That is, the module system 11 has redundancy.

The controls of the module system 11, the dynamotor 14, and the power input/output device 15 by the integration control device 5 will be described in more detail.

The controls by the integration control device 5 include control based on mutual comparison of the pieces of status information of the power storage devices $4_1 \sim 4_n$ of the respective unit power storage modules $10_1 \sim 10_n$, later-described limitation controls of (1) current limitation~(7) temperature variation limitation, and (8) cooling fan control. The status information includes the current, the total voltage, the cell voltage, the SOC (charge state, for example, a charge ratio), and the temperatures of the power storage devices $4_1 \sim 4_n$.

Concretely, the controls by the integration control device 5 include (1) current limitation, (2) total voltage limitation, (3) cell voltage limitation, (4) SOC limitation, (5) temperature limitation, (6) current variation limitation, (7) temperature variation limitation, and (8) cooling fan control. Incidentally, the unit power storage modules $10_1 \sim 10_n$ and the integration control device 5 only need to be connected by the data communication lines 18 so as to be capable of data communication of the status information and control data communication. In FIG. 1, the data communication lines 18 are schematically shown by arrows.

The integration control device 5 obtains the pieces of status information of the power storage devices $4_1 \sim 4_n$ (the currents, the total voltages, the cell voltages, the SOCs, the temperatures of the power storage devices) from the control devices $9_1 \sim 9_n$ of the respective unit power storage modules $10_1 \sim 10_n$. Then, the integration control device 5 compares the obtained pieces of status information of the power storage devices $4_1 \sim 4_n$ and detects one in which one of the statuses is inferior, among the unit power storage modules $10_1 \sim 10_n$. Further, the integration control device 5 controls the one with the inferior status among the unit power storage modules $10_1 \sim 10_n$ so that this status falls within a predetermined range. Consequently, the integration control device 5 manages the statuses of all the unit power storage modules $10_1 \sim 10_n$ so that they fall within standard regular ranges.

Further, when detecting an abnormality of some of the unit power storage modules $10_1 \sim 10_n$, the integration control device 5 disconnects the one whose abnormality is detected among the unit power storage modules $10_1 \sim 10_n$, and also performs the drive torque limitation control or the power generation limitation control. Here, the abnormality of the unit power storage modules $10_1 \sim 10_n$ includes, in particular, a case where the worst value of some of the unit power storage modules $10_1 \sim 10_n$ greatly deviates from the regular range, such as a case where the limitation controls of (1) current limitation~(7) temperature variation limitation are not realized.

The "worst value" mentioned here means the "worst value" for the power storage devices $4_1 \sim 4_n$ of the unit power storage modules $10_1 \sim 10_n$. In the power storage devices $4_1 \sim 4_n$, the regular ranges of values of the status information such as the voltage•temperature and so on are defined as the specification thereof. A value of the status information whose deviation degree is the largest among those of the power storage devices $4_1 \sim 4_n$ connected in parallel becomes the "worst value". In particular, the value whose deviation degree from the regular range (in other words, a usable range) is the largest is defined as the "worst value". That is, the power storage device $4_1 \sim 4_n$ whose value of the status information is the "worst value" is in a state of approaching a region where the limitation is gradually applied (however, this region is a usable region), and is in a state where it should not be used when deviating from the region where the limitation is gradually applied.

In normal use, if the values of the pieces of status information of all the power storage devices $4_1$~$4_n$ fall within the regular ranges, the integration control device 5 does not execute the controls of the various limitations (the above-described (1)~(8)). When the value of the status information of the power storage device $4_1$~$4_n$ of one of the unit power storage modules $10_1$~$10_n$ falls out of the regular range, one of the limitations among the above-described (1)~(8) becomes severe due to the value of the status information, of the unit power storage module $10_1$~$10_n$, falling out of the regular range. Therefore, the value of the status information falling out of the regular range becomes the "worst value". The integration control device 5 considers the unit power storage modules $10_1$~$10_n$ with a relatively high status level as being equal in level to the unit power storage modules $10_1$~$10_n$ with a relatively low status level. Therefore, the power storage system 2 operates while reducing the whole load.

When the values of the pieces of status information of plural ones of the unit power storage modules $10_1$~$10_n$ deviate from the regular ranges, one in which the deviation degree is large becomes the unit power storage module $10_1$~$10_n$ with the worst value. In normal use, the deviation of the values of the pieces of status information from the regular ranges occurs in order from the value of the unit power storage module $10_1$~$10_n$ having the "worst value". Then, in the control by the integration control device 5, the above-described limitations (1)~(8) are included in order accordingly.

The integration control device 5 tries to maintain a state where all the relations of the current•voltage•charge ratio and so on "hold" in the limitations of (1) current limitation~(7) temperature limitation, excluding (8) cooling fan control among the above-described (1) current limitation~(8) cooling fan control. Therefore, the integration control device 5 basically controls a cooling system (here, a cooling fan of the module system 11) so that it operates according to its specification, after controlling the power storage system 2 within the regular ranges of the charge ratios•currents being the specification of the power storage devices $4_1$~$4_n$. That is, the integration control device 5 executes (8) cooling fan control. Consequently, a frequency with which the control by the integration control device 5 involves the other limitations (=the limitations of (1) current limitation~(7) temperature variation limitation) decreases.

However, the control of external charge by the eternal charger 17 is often executed based on the voltage. Therefore, the voltages of the power storage devices $4_1$~$4_n$ are sometimes used positively in the control.

As for the limitation control by the integration control device 5, when any limitation among (1) current limitation~(7) temperature variation limitation is "not realized" at the time of a request for driving the drive motor 13, the torque limitation of the drive motor 13 is mainly performed. Generally, since the drive motor 13 used in the exemplified hybrid vehicle operates under torque control, a measure for the various limitations is mainly the torque limitation. The way to apply the torque limitation varies. For example, it includes a method of strict adjustment to a limit value, a method to apply the limitation with allowance, and so on. Examples of the limitation will be shown below.

(1) Current Limitation

The integration control device 5 calculates a usable power from current limit values and the voltages of the power storage devices $4_1$~$4_n$, divides the calculated usable power by a motor rotation speed of the drive motor 13 to decide a torque limit value, and controls an actual drive torque for powering/regeneration within the decided torque limit value. A torque control value (a value of the actual drive torque decided by the integration control device 5) at this time is the torque limit value at the maximum and becomes a desired value reflecting an intention of a driver (user of the electric-powered vehicle 1), which is equal to or lower than the torque limit value.

(2) Total Voltage Limitation

A map of a usable power for the total voltage is set in advance. The map is set so that a charge power becomes small when the total voltage is high and a discharge power becomes small when the total voltage is low. The integration control device 5 divides a value (power here) read from the map by the motor rotation speed of the drive motor 13 to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

(3) Cell Voltage Limitation

A map of a usable power for the voltage of the the cells 3 is set in advance. This map is set so that the charge power becomes small when the cell voltage is high and the discharge power becomes small when the cell voltage is low. The integration control device 5 divides a value (power here) read from the map by the motor rotation speed of the drive motor 13 to decide the torque limit value and controls the actual drive torque for the powering/regeneration within the torque limit value. A torque control value at this time is the torque limit value at the maximum and becomes a desired value reflecting an intention of the driver, which is equal to or lower than the torque limit value.

(4) SOC Limitation

A map of powering/regeneration limit ratios for the SOC is set in advance. This map is set so that the regeneration limit ratio becomes large when the SOC is high and the powering limit ratio becomes large when the SOC is low. The integration control device 5 multiplies a torque requirement by a value (powering/regeneration limit ratio here) read from the map and sets the resultant value as a final torque requirement. A value of the actual drive torque controlled at this time becomes the torque limit value.

The integration control device 5 generally adjusts the SOC (State of Charge) within a range where this limitation is not applied. For example, the integration control device 5 makes the adjustment such as increasing a power generation amount when the SOC becomes low and preventing the power generation when the SOC becomes high.

(5) Temperature Limitation

A map of a usable power absolute value is set in advance for the temperature of the power storage devices $4_1$~$4_n$ of the unit power storage modules $10_1$~$10_n$. This map is set so that the charge power and the discharge power become small when the temperature is high. The integration control device 5 divides a value (power here) read from the map by the motor rotation speed of the drive motor 13 to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

The integration control device 5 generally controls the cooling fan so as not apply this limitation.

(6) Current Variation Limitation

A map of a usable power absolute value is set in advance for current variation (for example, a current deviation in a combination with the largest current deviation between the unit power storage modules). This map is set so that the charge power and the discharge power become small when the variation is large. The integration control device 5 divides a value (power here) read from the map by the motor rotation speed of the drive motor 13 to decide the torque limit value, and controls the actual drive torque for the powering/regeneration within the limit value. A torque control value at this time is the torque limit value at the maximum and becomes a desired value reflecting an intention of the driver, which is equal to or lower than the torque limit value.

When the current variation is excessively large, the power storage devices $4_1$~$4_n$ have an abnormality and therefore, the integration control device 5 determines that the power storage system 2 has an abnormality. Consequently, it is promoted to stop the power storage system 2, whereby the spread of the abnormality is prevented.

(7) Temperature Variation Limitation

A map of a usable power absolute value is set in advance for temperature variation (for example, a temperature deviation in a combination with the largest temperature deviation between the unit power storage modules). This map is set so that the charge power and the discharge power become small when the variation is large. The integration control device 5 divides a value (power here) read from the map by the motor rotation speed to decide the torque limit value, and controls the actual drive torque for the powering/regeneration within the torque limit value. A torque control value at this time is the torque limit value at the maximum and becomes a desired value reflecting an intention of the driver, which is equal to or lower than the torque limit value.

Further, as the limitation control, the integration control device 5 may perform power generation limitation to the power generator 12 and external charge limitation to the external charger 17 in addition to the drive torque limitation to the drive motor 13. Among them, the power generation limitation to the power generator 12 and the external charge limitation to the external charger 17 limit the charging of the unit power storage modules $10_1$~$10_n$.

A plurality of pieces of hardware (devices) can cause these limitations to be realized or not, and there is a possibility that the limitations occur to these pieces of hardware. Therefore, also possible is a structure in which the integration control device 5 performs the limitations which are combined in a matrix manner, taking the number of the pieces of hardware and the above limitations of (1) current limitation~(7) temperature variation limitation on the axes. When the integration control device 5 thus controls the "combination" of the pieces of hardware, the control becomes more complicated as the number of the hardware increases. Therefore, here, a structure in which the aforesaid maps are set for each of the pieces of hardware is employed.

As a matter of course, the integration control device 5 may perform the optimum limitation to the "combination" of the pieces of hardware. In this case, the complicated control is necessary, but on the other hand, by simplifying part of the operation of the power storage system 2 for streamlining, it is possible to do without the maps.

When the plural limitations among the above-described (1) current limitation~(7) temperature variation limitation are "not realized", the integration control device 5 uses the worst value of the plural limit values for controlling the torque. For example, when there are both a powering torque limit τi (>0) by the total voltage limitation and a powering torque limit τt (>0) by the temperature variation at the same time, the integration control device 5 sets the smallest value of the powering torque limit τi and the powering torque limit τt as the final powering torque limit value. That is, the integration control device 5 selects the torque control value with a smaller value indicating larger limitation, from the torque control values, and based on this, performs the control.

When disconnecting one of the unit power storage modules $10_1$~$10_n$ due to an abnormality, the integration control device 5 may simply eliminate the status information (numerical value) regarding the disconnected one of the unit power storage module $10_1$~$10_n$. However, a state where one of the unit power storage modules $10_1$~$10_n$ has to be disconnected due to an abnormality is a state of emergency. Therefore, in this case, the integration control device 5 shifts the state of the power storage system 2 of the electric-powered vehicle 1 from normal-time control to abnormal-time control according to a characteristic of the power storage system 2. At an instant when one of the unit power storage modules $10_1$$10_n$ is disconnected, the power storage system 2 of the exemplified electric-powered vehicle 1 desirably shifts to a state of escape running such as a "limp home mode: a running mode enabling a minimum necessary running in an emergency". Incidentally, the disconnection of the unit power storage modules $10_1$~$10_n$ is performed by the opening/closing of switches (contactors $6_1$~$6_n$, $7_1$~$7_n$).

As described above, the electric-powered vehicle 1 has the plural unit power storage modules $10_1$~$10_n$ connected in parallel. The unit power storage modules $10_1$~$10_n$ are composed of the power storage devices $4_1$~$4_n$, the contactors $6_1$~$6_n$, $7_1$~$7_n$, the current sensors $8_1$~$8_n$, and the control devices $9_1$~$9_n$ capable of managing them. Further, the electric-powered vehicle 1 is provided with the dynamotor 14 as the electrical load whose driving is controlled by using the powers of the power storage devices $4_1$~$4_n$ and the integration control device 5 connected to the dynamotor 14 and the control devices $9_1$~$9_n$ of the unit power storage modules $10_1$~$10_n$. According to such a structure, it is possible to enlarge and reduce the scale of the system. Further, scalability of the capacity can be ensured.

Further, in the electric-powered vehicle 1, the unit power storage modules $10_1$~$10_n$ are provided with the control devices $9_1$~$9_n$ capable individually managing them. Therefore, the integration control device 5 does not have to perform detailed management of the individual unit power storage modules $10_1$~$10_n$. Therefore, it is possible to simplify the management control of the unit power storage modules $10_1$~$10_n$ by the integration control device 5, and at the same time to improve easiness of capacity expansion.

The electric-powered vehicle 1 is equipped with the dynamotor 14 as the electrical load, and is provided with the power input/output device 15 capable of controlling the input and the output of the powers to/from the unit power storage modules $10_1$~$10_n$. Then, the integration control device 5 controls the dynamotor 14 and the power input/output device 15. Therefore, it is possible to apply the same system not only to vehicles whose specifications of the capacities of the unit power storage modules $10_1$~$10_n$ are different but also to vehicles of completely different vehicle types.

Further, as a single vehicle, the electric-powered vehicle 1 is capable of escape running by disconnecting an abnormal one of the unit power storage modules $10_1$~$10_n$. Further, even when the unit power storage modules $10_1$~$10_n$ are increased/decreased as a capacity change later, it is not necessary to adjust the control of the whole system.

The integration control device 5 of the electric-powered vehicle 1 obtains the pieces of status information of the power storage devices $4_1$~$4_n$ from the control devices $9_1$~$9_n$ of the unit power storage modules $10_1$~$10_n$, compares the obtained pieces of status information with one another to detect the worst value, and controls the driving of the dynamotor 14 as the electrical load based on the worst value of the pieces of status information. Then, when the unit power storage modules $10_1$~$10_n$ have an abnormality, the integration control device 5 of the electric-powered vehicle 1 disconnects the unit power storage modules $10_1$~$10_n$, and performs the drive torque limitation control or the power generation limitation control. Since the unit power storage modules $10_1$~$10_n$ are connected in parallel, partial disconnection of each of the unit power storage modules $10_1$~$10_n$ is possible. Therefore, the module system 11 becomes a multiplexed system and can be a fault-tolerant system having redundancy. Then, it is possible to improve usability of the module system 11 and the power storage system 2 to which the module system 11 is applied.

Incidentally, the above-described example has the structure in which the control devices $9_1$~$9_n$ provided in the unit power storage modules $10_1$~$10_n$ monitor the currents·voltages of the unit power storage modules $10_1$~$10_n$ and control the contactors $6_1$~$6_n$, $7_1$~$7_n$, but an alternative possible structure is that the integration control device 5 directly controls them. Further, the control devices $9_1$~$9_n$ provided in the respective unit power storage modules $10_1$~$10_n$ may communicate with one another to take on part of the functions of monitoring·controlling the unit power storage modules $10_1$~$10_n$ by the integration control device 5.

Further, capacitors may be used instead of the high-voltage power storage devices $4_1$~$4_n$ in the unit power storage modules $10_1$~$10_n$. However, when the unit power storage modules $10_1$~$10_n$ including the power storage devices $4_1$~$4_n$ and the unit power storage modules $10_1$~$10_n$ including the capacitors co-exist in the same power storage system 2, the integration control device 5 controls the former and the latter as separate module systems 11. Another possible structure is to provide a plurality of the module systems 11 of different kinds in the same power storage system 2. Another possible structure is to provide another controller (control device) integrally controlling the plural module systems 11, on a hierarchy level under the integration control device 5.

In the foregoing, the embodiment of the present invention is described in detail, but the above-described embodiment only shows a concrete example in carrying out the present invention. The technical scope of the present invention is not limited to the above-described embodiment. Various changes can be made in the present invention without departing from its spirit, and they are also included in the technical scope of the present invention.

Industrial Applicability

The invention can realize the ensuring of scalability of a capacity by an increase/decrease of power storage devices, the simplification of management control, and the improvement of easiness of capacity expansion in a power storage system of an electric-powered vehicle. An application target of the present invention is not limited to a hybrid vehicle, an electric vehicle, or the like. For example, the present invention is applicable to a system equipped with a power generator and power storage devices, such as an internal-combustion vehicle, an auxiliary power supply system such as an uninterrupted power supply device, a buffer of a small-scale power station, and the like.

The invention claimed is:

1. An electric-powered vehicle comprising:
    a plurality of parallel-connected unit power storage modules each including a power storage device, a contactor connected in series to the power storage device, and a control device capable of managing a status of the power storage device;
    an electrical load, connected to the power storage device through the contactor, whose driving is controlled by using powers of the power storage devices; and
    an integration control device connected to at least the control devices of the unit power storage modules,
    wherein the electrical load includes at least one dynamotor controlled by the integration control device, and
    wherein the integration control device, when detecting an abnormality of any of the unit power storage modules, performs open and close control of the contractor of the unit power storage module having the detected abnormality, and limits a drive torque of the dynamotor.

2. The electric-powered vehicle according to claim 1, wherein the electrical load comprises a power input/output device controlled by the integration control device and capable of controlling input and output of the powers both to and from the unit power storage modules.

3. The electric-powered vehicle according to claim 1, wherein the integration control device:
    obtains status information of each of the power storage devices from the control device of each of the unit power storage modules,
    compares the obtained pieces of status information of the power storage devices with one another to detect a worst value,
    controls the driving of the dynamotor as the electrical load based on the worst value of the pieces of status information, when detecting an abnormality of any of the unit power storage modules, performs open and close control of the contractor of the unit power storage module having the abnormality; and
    limits power generation control of the dynamotor,
    wherein the worst value is the status information with the largest deviation from a regular range of values for the status information.

* * * * *